United States Patent
Kumar et al.

(10) Patent No.: US 12,210,538 B2
(45) Date of Patent: Jan. 28, 2025

(54) MULTI-INSTANCE, MULTI-ANSWER TRAINING FOR TABLE AND TEXT QUESTION ANSWERING

(71) Applicant: International Business Machines Corporation, Armonk, NY (US)

(72) Inventors: Vishwajeet Kumar, Bangalore (IN); Saneem Ahmed Chemmengath, Bangalore (IN); Jaydeep Sen, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 311 days.

(21) Appl. No.: 18/053,585

(22) Filed: Nov. 8, 2022

(65) Prior Publication Data

US 2024/0160634 A1    May 16, 2024

(51) Int. Cl.
*G06F 16/24* (2019.01)
*G06F 16/2452* (2019.01)
*G06F 16/2458* (2019.01)
*G06N 5/022* (2023.01)

(52) U.S. Cl.
CPC .... *G06F 16/2465* (2019.01); *G06F 16/24522* (2019.01); *G06N 5/022* (2013.01)

(58) Field of Classification Search
None
See application file for complete search history.

(56) References Cited

U.S. PATENT DOCUMENTS

| | | | | |
|---|---|---|---|---|
| 11,663,497 | B2* | 5/2023 | Sinha | G06N 3/045 |
| | | | | 706/45 |
| 11,822,732 | B1* | 11/2023 | Zhu | G06F 3/033 |
| 2019/0278838 | A1 | 9/2019 | Mungi et al. | |
| 2021/0326531 | A1* | 10/2021 | Kumar | G06F 40/279 |

(Continued)

OTHER PUBLICATIONS

Chen et al., Open Question Answering Over Tables and Text, Computation and Language; Artificial Intelligence; arXiv:2010.1043920; Oct. 2020, 18 pgs.

(Continued)

*Primary Examiner* — Eliyah S. Harper
(74) *Attorney, Agent, or Firm* — Amin, Turocy & Watson, LLP

(57) ABSTRACT

Techniques for enhanced table and text question answering based on multi-instance, multi-answer training are presented. An answer extractor component can determine answer scores associated with candidate answer data items based on analysis of a set of data, comprising row data items of a table and passage data items associated with the table, and a context of a query of the set of data. The answer extractor component can be trained based on application of denoised single-instance and multiple-instance answer matching data associated with contexts to an answer extractor model to generate a trained answer extractor model of the answer extractor component. A query response component can determine a correct answer data item responsive to the query from the candidate answer data items based on the answer scores associated with the candidate answer data items, wherein the candidate answer data items can be reranked based on reweighted answer scores.

20 Claims, 11 Drawing Sheets

(56) References Cited

U.S. PATENT DOCUMENTS

| | | |
|---|---|---|
| 2022/0044134 A1 | 2/2022 | Joy et al. |
| 2022/0101103 A1* | 3/2022 | Fatemi .................. G06N 3/088 |
| 2022/0398399 A1* | 12/2022 | Muffat ................. G06V 30/416 |
| 2023/0035338 A1* | 2/2023 | Zheng ................ G06F 16/3347 |
| 2023/0136515 A1* | 5/2023 | Wu ........................ G06F 18/21 |
| | | 382/157 |

OTHER PUBLICATIONS

Zhong et al., Reasoning over Hybrid Chain for Table-and-Text Open Domain Question Answering, arXiv:2201.05880, Jan. 2022, 11 pgs.

Kumar et al., Multi-Instance Training for Question Answering Across Table and Linked Text, https://doi.org/10.48550/arXiv.2112.07337, Dec. 2021, 11 pgs.

Kumar et al., Multi-Row, Multi-Span Distant Supervision For Table+Text Question Answering, https://doi.org/10.48550/arXiv.2112.07337v2, Oct. 2022, 14pgs.

\* cited by examiner 900 (continued)

A

914 — DETERMINING RESPECTIVE ANSWER SCORES ASSOCIATED WITH RESPECTIVE CANDIDATE ANSWER ITEMS BASED ON ANALYSIS OF THE QUERY DATA AND/OR THE CONTEXT ASSOCIATED WITH THE QUERY, THE RESPECTIVE ROW DATA ITEMS OF THE RESPECTIVE ROWS OF THE DESIRED NUMBER OF RESPECTIVE ROWS, AND THE ASSOCIATED RESPECTIVE PASSAGE DATA ITEMS

916 — BASED ON THE RESPECTIVE ANSWER SCORES AND A DEFINED CANDIDATE ANSWER ITEM FILTER CRITERIA RELATED TO ANSWER EXTRACTION, PROVIDING A DESIRED NUMBER OF THE RESPECTIVE CANDIDATE ANSWER ITEMS AND THE RESPECTIVE ANSWER SCORES ASSOCIATED THEREWITH AS AN OUTPUT FOR FURTHER PROCESSING

918 — APPLYING RESPECTIVE WEIGHT VALUES TO THE RESPECTIVE ANSWER SCORES ASSOCIATED WITH THE DESIRED NUMBER OF THE RESPECTIVE CANDIDATE ANSWER ITEMS AND THE RESPECTIVE RELEVANCE SCORES ASSOCIATED WITH THE DESIRED NUMBER OF THE RESPECTIVE ROWS TO GENERATE WEIGHTED SCORES ASSOCIATED WITH THE RESPECTIVE CANDIDATE ANSWER ITEMS AND THE RESPECTIVE ROWS BASED ON DEFINED SCORE WEIGHTING CRITERIA

920 — DETERMINING THE CORRECT ANSWER DATA ITEM RESPONSIVE TO THE QUERY BASED ON THE RESPECTIVE WEIGHTS SCORES

922 — PRESENTING THE CORRECT ANSWER DATA ITEM IN RESPONSE TO THE QUERY

FIG. 10

MULTI-INSTANCE, MULTI-ANSWER TRAINING FOR TABLE AND TEXT QUESTION ANSWERING

BACKGROUND

The subject disclosure relates to multi-instance, multi-answer training for table and text question answering.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, computer-implemented methods, apparatuses, and/or computer program products that can desirably perform multi-instance, multi-answer training to facilitate performing table and text question answering are provided.

An embodiment relates to a system comprising a memory that stores computer-executable components; and a processor, operatively coupled to the memory, that executes computer-executable components. The computer-executable components can comprise an answer extractor component that determines answer scores associated with candidate answer data items based on an analysis of a set of data associated with a table and a context of a query of the set of data, wherein the answer extractor component is trained based on application of denoised multiple-instance answer matching data associated with contexts to an answer extractor model to generate a trained answer extractor model of the answer extractor component. The computer-executable components also can include a query response component that determines a correct answer data item responsive to the query from the candidate answer data items based on the answer scores associated with the candidate answer data items.

In some embodiments, elements described in connection with the disclosed system can be embodied in different forms such as a method, a computer program product, or another form.

These and other features will become apparent from the following detailed description of illustrative embodiments thereof, which is to be read in connection with the accompanying drawings.

DESCRIPTION OF THE DRAWINGS

FIGS. 9 and 10 depict a flow diagram of another example, non-limiting method that can perform enhanced text and table question answering based on multi-instance, multi-answer training, in accordance with various aspects and embodiments of the disclosed subject matter.

DETAILED DESCRIPTION

Figure 1:
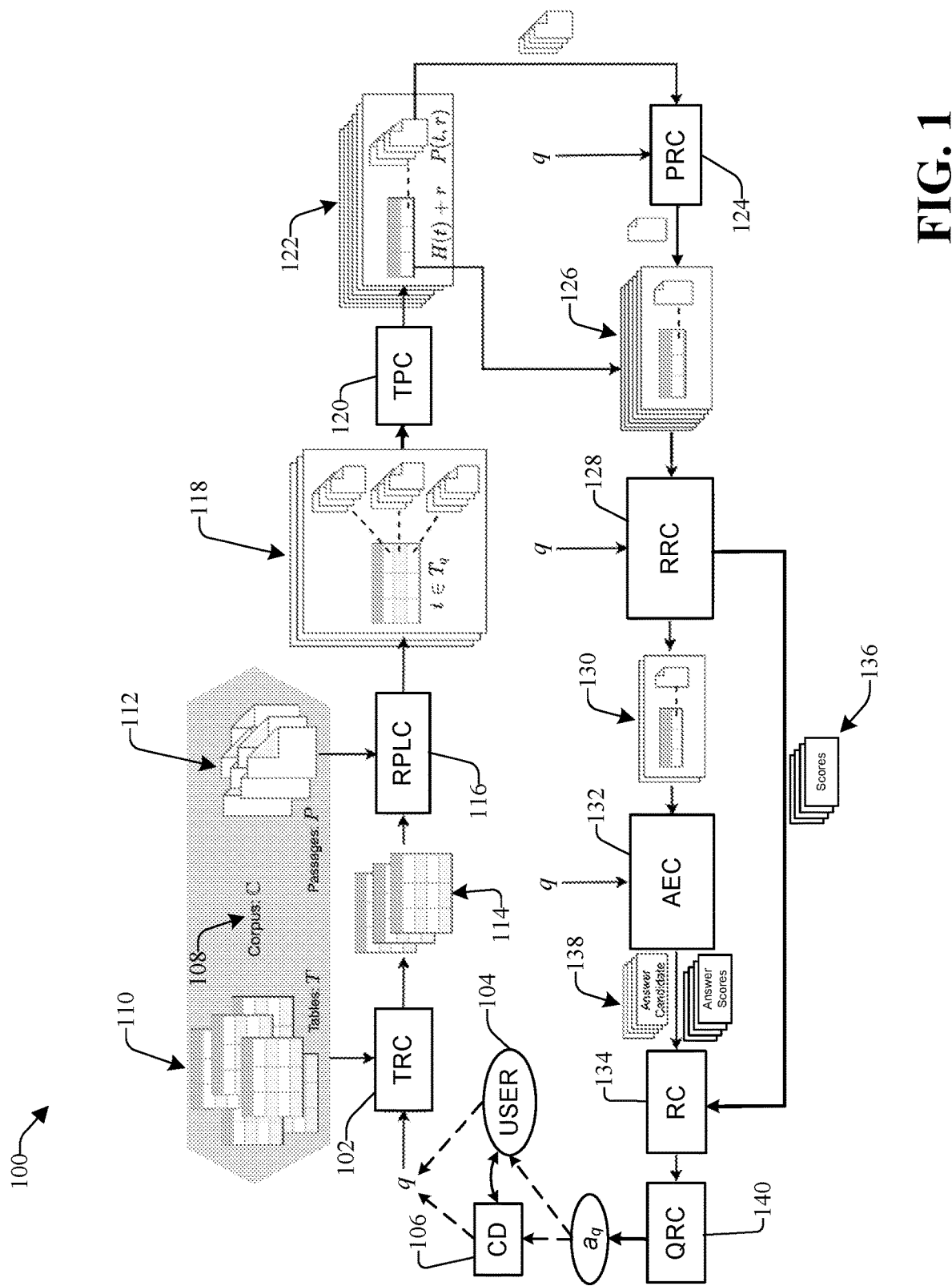
FIG. 1 illustrates a block diagram of an example, non-limiting system that can perform enhanced text and table question answering based on multi-instance, multi-answer training, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Utilizing computer or machine-based systems to answer natural language questions using information from tables (e.g., table question answering (TableQA)) is an area of interest. In many applications, tables do not occur in isolation, but rather tables can be embedded in or linked to unstructured textual information. For instance, table cells of a table can comprise links (e.g., hyperlinks) to unstructured textual information, and/or a table can be embedded in an electronic document that also includes unstructured textual information.

Utilizing computer or machine-based systems to answer natural language questions by searching for answers in information from electronic documents can be challenging for a number of reasons. Electronic documents often can comprise densely packed information that often can included embedded structured elements, such as tables, in addition to unstructured or free form textual information, which can involve a text and table QA (Text+TableQA) scenario. Further, answering questions over such electronic documents frequently can involve cross-referencing between contents of tables and unstructured textual information, and also frequently may involve multiple hops of reasoning in order to determine the correct answer to a question. Often, a question may be best answered by matching its parts to either contents of a table cell or unstructured text spans (e.g., unstructured or free form textual information), and extracting answers from either of those sources (e.g., contents of a table cell, or contents of an unstructured text span).

There are existing QA datasets and benchmarks that may be used to measure performance of QA systems, however, those existing QA datasets and benchmarks typically measure performance over homogenous data sources, such as data sources using only text, or data sources using only tables, as opposed to question answering over hybrid context, with intermingling of table and unstructured textual information.

Existing systems and techniques for question answering may have some use for answering questions using homogenous data sources, but can be undesirable (e.g., deficient, inefficient, inaccurate, or unsuitable) for use in answering questions using hybrid context and/or heterogeneous data sources involving tables and unstructured textual information. Some existing systems, such as machine reading comprehension systems can rely on (e.g., can require) ground truth start and end index as supervision for training. However, in HybridQA, neither ground truth start and end index may be available (e.g., for the case where the answer is available in a passage connected to cells in a table row) nor may the table cell coordinates be available (e.g., for the case where the answer is in the table cell). Further, high level supervision of whether the correct answer is in a cell in a table or a passage span in the text (e.g., passage span associated with a table cell(s)) also may not be available, which can make the task of determining the correct answer challenging.

Existing systems and techniques for question answering also can be undesirable due to limitations (e.g., a limited input sequence length) on the input of data from the question and/or from the data sources. For instance, training of these existing systems on datasets, either via self-supervision or fine tuning, can have an undesirably limited input sequence length. This can result in relevant context associated with a question or data source content being lost or missing, which may result in an incorrect or inaccurate answer being produced by the system in response to the question. Existing techniques and approaches to question answering also can be undesirable (e.g., deficient, inefficient, inaccurate, or unsuitable) as they can suffer from significant problems, including a multiple instance problem, in that there can be multiple rows of a table that can contain the answer as a table cell information value or as a span of textual information associated therewith, and a multiple answer problem, in that candidate answers may appear as multiple token spans or as information values in table cells.

It can be desirable to be able to overcome these and other deficiencies associated with existing systems and techniques. It can be desirable for a question answering system to efficiently, reliably, and accurately determine answers to questions over hybrid contexts and/or from heterogeneous data sources, such as contents of tables and unstructured textual information. It also can be desirable to suitably and efficiently train models (e.g., artificial intelligence (AI)-based models) of the question answering system to enable such efficient, reliable, and accurate determinations of answers to questions over hybrid contexts and/or from heterogeneous data sources. In that regard, it further can be desirable for the question answering system to be able to reliably and accurately determine a correct answer to a question over hybrid contexts and/or from heterogeneous data sources when there can be multiple rows of a table that can contain the answer as a table cell information value or as a span of textual information associated with the table, and/or there can be multiple candidate answers that may appear as multiple token spans (e.g., unstructured textual, free form, or passage spans) or as information values in table cells.

The disclosed subject matter can be implemented to produce a solution to these problems and/or other problems associated with existing approaches for question answering involving text and table QA (Text+TableQA) scenarios and to achieve the desired goals for a question answering system (e.g., efficiently, reliably, and accurately determine answers to questions over hybrid contexts and/or from heterogeneous data sources; suitably and efficiently train models of the question answering system; and reliably and accurately determine a correct answer to a question over hybrid contexts and/or from heterogeneous data sources in multi-instance and multi-answer scenarios). To that end, the various aspects and embodiments herein relate to techniques for enhanced text and table question answering based on multi-instance, multi-answer training, such as described herein.

These and other aspects and embodiments of the disclosed subject matter will now be described with respect to the drawings.

FIG. 1 illustrates a block diagram of an example, non-limiting system 100 that can perform enhanced text and table question answering based on multi-instance, multi-answer training, in accordance with various aspects and embodiments of the disclosed subject matter. The system 100 (e.g., a multi-instance trained question-answer (MITQA) system) can comprise a table retriever component (TRC) 102 that can receive queries (e.g., questions) from users (e.g., user 104) and/or communication devices, such as communication device 106 (e.g., via a wireless and/or wireline communication and/or cloud network). A communication device 106 can be, for example, a computer; a laptop computer; a mobile, smart, or cellular phone; an electronic tablet or pad; a wearable electronic device (e.g., electronic or smart watch, eyeglasses, or headset); or other type of computing or communication device.

In response to receiving a query (q) (e.g., a natural, unstructured, or free form language query; or a structured query in a structured format) from a user 104 or communication device 106, the table retriever component 102 can retrieve, from a corpus (C) 108 of tables (T) 110 and passage data items 112 (e.g., passages (P)), a group of tables, comprising respective content, such as structured content (e.g., respective row data items in cells of rows of the tables), that can be determined to be at least potentially relevant to responding to the query, based on analysis of query data of the query and a context of the query determined from the analysis. In some embodiments, from the group of tables, the TRC 102 can determine a subgroup of tables 114, comprising a desired number (e.g., top-k number, such as five, or a number less than or greater than five) of tables ($T_q$), that can be determined to have a relatively higher relevancy to the context of the query than other tables of the group of tables.

The system 100 also can include a row passage linker component (RPLC) 116 that can be associated with (e.g., communicatively connected to) the TRC 102, and can retrieve passage data items (e.g., unstructured for free form passage data items (also referred to as passage spans)) associated with the subgroup of tables from the corpus 108. For instance, some of the row data items of the cells in rows of the tables of the subgroup of tables 114 can comprise links (e.g., hyperlinks) to respective passage data items. The RPLC 116 can identify the respective passage data items associated with the respective row data items (e.g., the links of the respective row data items) of those tables, can retrieve the respective passage data items from the corpus 108, and can associate (e.g., link) the respective passage data items with the respective row data items of those tables, as indicated at reference numeral 118. It is noted that, with regard to a row data item that does not include a link to a particular passage data item, there still may be an association (e.g., a relevance) between the row content of the row data item and the passage content of the particular passage data item. In some embodiments, the RPLC 116 can comprise or employ a link inference or predictor component, which can be or comprise an AI component (e.g., 204), such as described herein, to infer or predict a link or association between the row data item and the particular passage data item based on the results of analyzing the row content of the row data item, the passage content of the passage data item, and/or other desired (e.g., pertinent) information. It also is noted that there may be some tables that do not include any explicit links (e.g., hyperlinks) to passages. With regard to such a table containing no explicit links, the RPLC 116, employing the link inference or predictor component and/or AI component, can infer or predict one or more links or associations between one or more rows and one or more passages based on the results of analyzing row content of the rows of the table, passage content of the passages, and/or other desired information.

The system 100 also can comprise a table partitioner component (TPC) 120 that can be associated with the row passage linker component 116. The TPC 120 can receive the subgroup of tables and the respective passage data items associated therewith, and can partition (e.g., split or divide) the one or more tables of the subgroup of tables to form individualized or separated respective rows (H(t)+r), comprising the respective row data items, and associated with the respective passage data items (P(t,r)), based on the results of analyzing the one or more tables of the table subgroup, as indicated at reference numeral 122. Through table partitioning by the TPC 120, a single row of a table can be a smallest unit of operation.

In some embodiments, the system 100 can include a passage ranker component (PRC) 124 that can be associated with the TPC 120, and can receive the respective passage data items from the TPC 120. The PRC 124 can analyze the respective passage data items and query data of the query, and can determine (e.g., calculate) respective passage relevance scores (e.g., passage relevance values) associated with the respective passage data items based on the results of analyzing the respective passage data items and the context associated with the query and/or the respective passage data items. A passage relevance score can indicate or represent the level of relevance the associated passage data item can have to the context of the query, wherein a higher passage relevance score can indicate a higher relevance to the context of the query, and a lower passage relevance score can indicate a lower relevance to the query context. The PRC 124 can rank and/or filter the respective passage data items based on the respective passage relevance scores associated with the respective passage data items. For instance, the PRC 124 can rank, order, and/or filter (e.g., filter out some passage data items that have lower passage relevance scores) based on the respective passage relevance scores, such that passage data items having higher passage relevance scores can be ranked higher than other passage data items having relatively lower passage relevance scores. Thus, given the row and the query, the PRC 124 can rank and/or filter the passage data items before concatenating them into a context.

The system 100 also can comprise a row retriever component (RRC) 128 that can be associated with the TPC 120 and PRC 124. The RRC 128 can receive the respective rows (H(t)+r), comprising the respective row data items, from the TPC 120, and can receive the respective passage data items, or at least some of the respective passage data items (e.g., the passage data items having the higher passage relevance scores, and thus, determined to be more relevant to the query context), from the PRC 124, as indicated at reference numeral 126. The RRC 128 can determine respective row retrieval scores associated with the respective rows of the one or more respective tables based on the results of analyzing the context, the query data of the query, the respective header data items associated with the respective rows, the respective row data items, and/or the respective passage data items. A row retrieval score associated with a row can indicate or represent a likelihood, probability, relevance, or confidence level that the row contains or is associated with the correct answer, or at least a candidate answer item that can be a potentially correct answer, responsive to the query (e.g., a cell of the row or a passage data item associated with the row contains the correct answer or at least the candidate answer item). In some embodiments, the RRC 128 can be trained based on multi-instance training to enable the RRC 128 to desirably (e.g., suitably, enhancedly, more accurately, or optimally) determine the respective row retrieval scores associated with the respective rows, such as more fully described herein.

In certain embodiments, based on the respective row retrieval scores and defined row filter criteria, the RRC 128 can determine a desired number (e.g., top-k, such as five, or a different number greater than or less than five) of the respective rows that have relatively higher row retrieval scores than other row retrieval scores of other rows of the respective rows. The defined row filter criteria can indicate the desired number of rows (e.g., top-k rows) and/or a defined threshold row retrieval score to be satisfied (e.g., met or exceeded) by a row in order to be included in the desired number of the respective rows. The RRC 128 can provide the desired number of respective rows, including the respective row data items, and the associated respective passage data items, as an output (e.g., to an answer extractor component (AEC) 132 of the system 100) for further processing, as indicated at reference numeral 130. For instance, the RRC 128 can output the desired number of high confidence rows, including the respective row data items, and the associated respective passage data items, pertaining to the query, which can be fed (e.g., input) to the AEC 132 to obtain an answer per question-row-context that is fed as input. In some embodiments, the row retriever component 128 can provide (e.g., communicate) the respective row retrieval scores associated with the desired number of respective rows to a reranker component (RC) 134 of the system 100 for further processing, as indicated at reference numeral 136.

The AEC 132 can analyze the respective row data items of the respective rows of the desired number of respective rows, the associated respective passage data items, and/or the query data and/or the context associated with the query. Based on such analysis results, including the context associated with the query, the AEC 132 can determine and extract respective candidate answer items from the respective row data items and/or the respective passage data items, and can determine (e.g., calculate) respective answer scores associated with the respective candidate answer items. A candidate answer item can be certain data in a row data item or certain data in a passage data item that potentially can be the correct answer to the query. The respective answer scores can indicate the respective and relative probability, likelihood, relevance, and/or confidence levels that the respective candidate answer items are the correct answer to the query. In certain embodiments, the AEC 132 can be trained to desirably (e.g., more accurately, enhancedly, or optimally) determine answer scores associated with candidate answer items based on a multi-answer training process (e.g., using a multi-answer training (MAT) paradigm), including application (e.g., by a trainer component) of denoised single-answer answer matching data and denoised multi-answer answer matching data associated with contexts to an answer extractor model of the AEC 132 to train the answer extractor model, such as described herein. The denoised single-answer answer matching data and the denoised multi-answer answer matching data can be part of a training dataset comprising tables with rows of training row data items and associated training passage data items.

The AEC 132 can determine a desired number (e.g., top-k number, such as five, or a different number greater than or less than five) of the respective candidate answer items that have higher answer scores than the other respective candidate answer items based on analysis of the respective answer scores and defined candidate answer item filter criteria relating to answer extraction. The AEC 132 can provide the desired number of the respective candidate answer items and the respective answer scores associated therewith as an output to the RC 134 for further processing, as indicated at reference numeral 138.

The RC 134 can determine whether to rerank, and/or can rerank (e.g., when reranking is determined to be appropriate), the candidate answer items based on a learned weighted combination of the row retriever scores and answer scores. The RC 134 can determine respective weight values to apply to the respective answer scores and the respective row retrieval scores, and can apply the respective weight values to the respective answer scores and the respective row retrieval scores to determine and generate respective weighted scores associated with the respective candidate answer items and the respective rows. In accordance with various embodiments, the RC 134 can determine the respective weight values based on training of a reranker model of the RC 134 or performing a grid search over an estimated search space and enhancing (e.g., optimizing) over the development set scores, such as more fully described herein.

The RC 134 (or another component of the system 100) can determine the correct answer data item responsive to the query from the candidate answer data items based on the respective weighted scores (e.g., weighted scores indicative of weighted likelihood, probability, relevance, or confidence levels). For instance, from the respective candidate answer data items, the RC 134 can determine the candidate answer data item that can be associated with the highest weighted score, and can determine that such candidate answer data item is the correct answer data item that is responsive to the query.

The system 100 also can comprise a query response component (QRC) 140 that can present (e.g., communicate, display, or emit) the correct answer data item ($a_q$), via an interface (e.g., interface of or associated with the QRC 140 or other component of the system 100) or a communication device, such as communication device 106 (e.g., to a user 104), in response to the query. In certain embodiments, the QRC 140 also can present the other candidate answer data items, their respective weighted scores, and/or other desired information, via the interface or communication device, wherein the respective weighted scores can be indicative of the respective likelihoods, probabilities, and/or confidence levels that the respective candidate answer items can be the correct answer to the query. In some embodiments, the RC 134 can be or can comprise the QRC 140.

Figure 2:
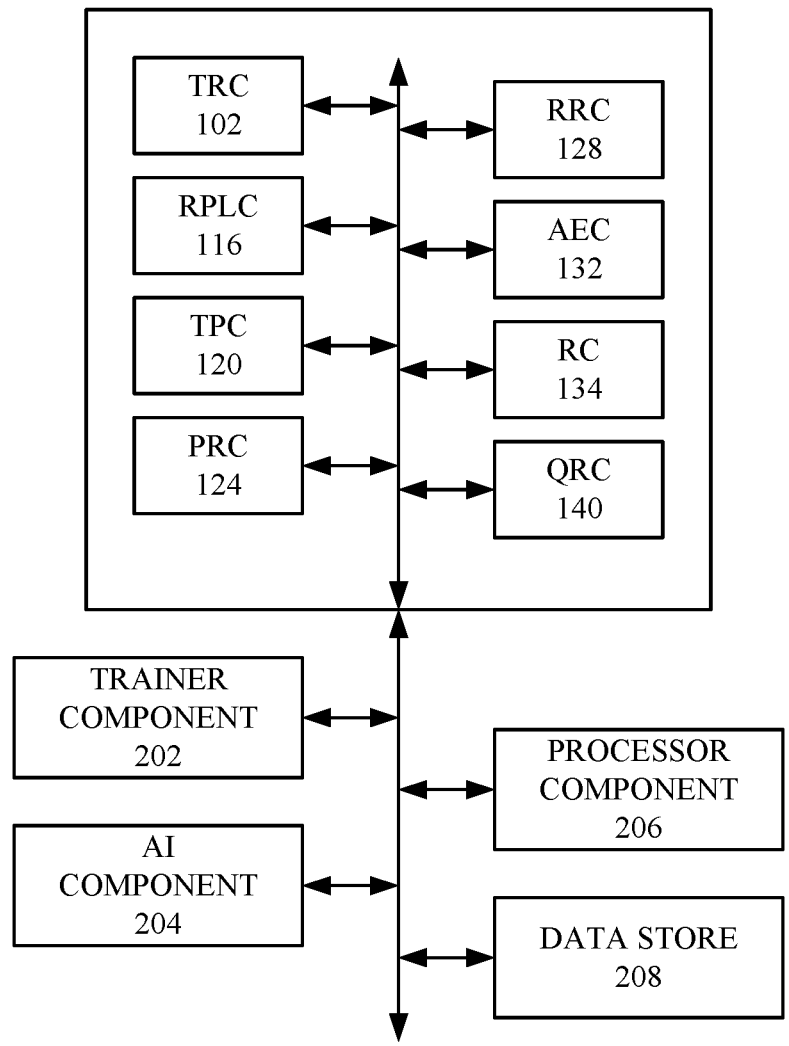
FIG. 2 depicts a block diagram of an example, non-limiting system that can employ artificial intelligence-based techniques to train various components (e.g., to perform multi-instance and/or multi-answer training of various components) and/or employ other techniques to enhance performance of the various components, in accordance with various aspects and embodiments of the disclosed subject matter.

Referring to FIG. 2 (along with FIG. 1), FIG. 2 depicts a block diagram of an example, non-limiting system 200 that can employ AI-based techniques to train various components (e.g., to perform multi-instance and/or multi-answer training of various components) of the system 100 (e.g., the MITQA system) and/or employ other techniques to enhance performance of the various components of the system 100, in accordance with various aspects and embodiments of the disclosed subject matter. The system 200 can comprise various components of the system 100, including the PRC 124, RRC 128, AEC 132, and/or RC 134. The system 200 also can comprise a trainer component 202, an AI component 204, a processor component 206, and a data store 208. The MITQA system can be a TextTableQA system that can explicitly model different, but relatively closely-related, probability spaces of table row selection and text span selection. The MITQA system can be a row-grounded question answering system capable of multi-hop reasoning over hybrid context of table and text. The MITQA system can comprise a multi-operation procedure with a row retriever (e.g., RRC 128) that can be utilized to identify the correct row, which comprises or is associated with the correct answer responsive to a query, and an answer extractor (e.g., AEC 132), which can desirably (e.g., more accurately) predict the answer span (e.g., in a cell of the retrieved row, or a passage span associated with the row) from or based on the retrieved row. In some embodiments, the MITQA system can utilize a passage ranker or filter (e.g., PRC 124) to rank higher and/or select passages associated with table rows that can be desirable (e.g., wanted, or more relevant) to answer the query. This passage ranking or filtering can be desirable, as that can enable the row retrieval and answer extractor modules (e.g., RRC 128 and AEC 132) to not have to handle undesirably large passages as input.

With regard to the RRC 128, given a query (e.g., question) and a table with cells optionally connected to passages, a task of the RRC 128 can be to identify the correct row from which the correct answer to the query can be obtained. In some embodiments, the RRC 128 can employ a bidirectional encoder representations from transformers (BERT)-based sequence classification model trained on a binary classification task with correct rows labeled as a first value (e.g., 1 s) and the rest of the rows labeled as a second value (e.g., 0 s). The query, table row, and the passages linked to the cells in the row can be passed to a BERT-Large encoder in a desired and specific format to obtain a latent representation. Given the query denoted as q, the column headers of the table as $\{c_1, \ldots, c_n\}$, the values for these columns for a particular row r as $\{v_1, \ldots, v_n\}$ and the passages linked to the cells in the row as $\{p_1, \ldots, p_m\}$, the input, x, to the BERT encoder (e.g., of the RRC 128) can be, for example, as follows in Equation (Eq.) 1:

$$x = q[CLS]c_1 \text{ is } v_1 \ldots c_n \text{ is } v_n \cdot [SEP]p_1 \ldots p_m, \quad \text{(Eq. 1)}$$

where "is" literally means the word "is," and [CLS] can refer to classification. The [CLS] embedding output by BERT can be sent to a feed-forward neural network of the AI component 204 to make a prediction (e.g., prediction regarding whether a row contains the correct answer or at least potentially contains the correct answer to a query). At the inference stage, all the {query, row} pairs can be passed through this sequence classification and the logits and/or scores for class 1 can be used by the RRC 128 to identify the best row(s) (e.g., the row that contains the correct answer or at least potentially contains, and can be most likely to contain, the correct answer to a query). It is to be appreciated and understood that, while some embodiments herein describe using a BERT-based sequence classification model and system, in other embodiments, the RRC 128 can employ a different row determination and retrieval model and/or sequence classification model that can be trained to desirably determine, identify, and retrieve a subset (e.g., subgroup) of rows that potentially can contain or be associated with a correct answer to a query.

It is noted that a row retrieval system that expects supervision in the form of gold retrieval unit (e.g., rows) can exact an undesirably high cognitive burden from annotator in preparing training instances. In the case of HybridQA, there may be only final answer-text as supervision, not the relevant row(s) or the passage span(s). Given a table with connected passages and a query, potential gold rows can be identified by exact string matching answer-text on rows (e.g., cells of rows and linked texts in passages). It can be observed that, in some instances, there can be multiple rows containing the potentially correct answer-text. For instance, in an example HybridQA training set, it can be observed that more than 40% of instances in the training set can have the problem of multiple rows containing the potentially correct answer-text, and, in some instances, the answer-text can appear in as many as 19 rows.

With regard to basic distant supervision, existing BERT models, and existing row retrieval techniques, it is noted that the basic distant supervision approach can have certain significant undesirable issues, including that significant relevant context from passages relevant to a query under consideration may be lost during training or use as BERT can have a limitation that a BERT model can truncate all tokens after a defined token limit (e.g., 512 tokens limit) is reached; and, also, if all potential correct rows are labeled as a 1 value and used for training, it may reduce the performance of a row retriever as most of those rows should be labeled with a 0 value. In response to these undesirable issues relating to basic distant supervision and the existing BERT-based row retriever model, the MITQA system and the system 200 can employ various enhancements (e.g., passage ranking and/or filtering; multi-instance training and multi-instance loss determinations with regard to the RRC 128) that can overcome these and other issues and deficiencies associated with existing or basic distant supervision and existing BERT-based row retriever models.

For instance, the PRC 124 can rank passages (e.g., certain passage data items associated with certain rows) determined to be most or more relevant to the context higher than the irrelevant or less relevant passages, such that, even if the BERT model truncates its input (e.g., based on the defined token limit), the RRC 128 does not lose or miss out on passages that can be most relevant to the query under consideration, since by ranking contextually more relevant passage data items higher than less relevant passage data items, the more relevant passage data items can be input to the BERT model of the RRC 128 at an earlier point in the input sequence to the BERT model (e.g., before or at least more likely before the defined token limit has been reached or satisfied) than the less relevant passage data items, wherein such less relevant passage data items that are later in the input sequence may be truncated and lost due to the defined token limit of the BERT model.

In certain embodiments, given a query, table, and a set of passages connected to cells in rows in the table, the PRC 124 can rank the respective passage data items of the passage set based on their respective relevance with the query, as determined by the PRC 124 based on the context of the query. In some embodiments, the PRC 124 can utilize sentence-BERT to obtain query and passage embeddings, and can perform an asymmetric semantic search to rank the respective passage data items based on the respective relevancy of the respective passage data items. This passage ranking of the PRC 124 can perform a desirable (e.g., useful, wanted, or significant) role in facilitating desirable (e.g., suitable, more accurate, enhanced, or optimal) row retrieval (e.g., by the RRC 128) and answer extraction (e.g., by the AEC 132). As disclosed, existing BERT models can have a limitation that they cannot process a sequence of length more than the defined token limit (e.g., 512 tokens) and passage ranking by the PRC 124 can desirably ensure that, even if the context associated with a query is truncated to fit the defined token limit of the BERT model, it can be unlikely that a passage data item(s) relevant to the query will be lost.

Also, in case the context contains multiple passage spans, passage ranking performed by the PRC 124 can facilitate bringing (e.g., moving or ranking) the correct answer span (e.g., passage data item or associated row data item containing the correct answer to the query) in the front of other less relevant data items of or associated with the table(s), which can thereby avoid or mitigate possible noisy labels (e.g., avoid or mitigate instances of multiple data items nominally matching the correct answer to the query, but without regard to context associated with the query, and with some of the multiple data items actually not being, or not necessarily being, the correct answer). This can be particularly significant and desirable, because a basic model of the answer extractor, without employing multi-answer training (MAT) (e.g., MAT, such as described herein), can backpropagate through the first span in the passage matching with the gold answer associated with a query.

In some embodiments, the RRC 128 can employ multiple-instance loss determinations (e.g., can employ a multiple-instance loss function that can determine multiple-instance loss) to address the problem of multiple potentially correct rows that may be identified in response to a query, and to determine or facilitate determining the correct row, of the potentially correct rows, that can contain the row data item that can comprise the correct answer to the query, or can be associated with a passage data item that can comprise the correct answer to the query. In certain embodiments, as part of training the RRC 128, the trainer component 202 can map this problem of multiple potentially correct rows into a multiple-instance learning setup, with query-row pairs as instances and potential correct rows for a query forming a bag. Formally, with a query q, and a table with rows $r_i \forall_i \{1, \ldots, T\}$, there can be a subset of rows, $B \subseteq \{1, \ldots, T\}$, that can be labeled with a first value (e.g., a 1 value), which can represent a row being determined to be relevant to the query, and the rest of the rows can be labeled with a second value (e.g., a 0 value), which can represent those remaining rows being determined to be irrelevant to the query. Let a function $f(\cdot)$ denote the row retrieval model (e.g., which can be a prediction model) which can input row $r_i$, encoded in the form $x_i$, and let $\ell$ be the binary classification loss computed as $\ell(y_i, f(x_i))$, where $y_i$ can be the gold label (e.g., a reliable ground-truth value) of instance $x_i$. For a given table and a query, row retriever loss (e.g., which can be determined by the RRC 128) can be defined or determined (e.g., calculated), for example, using Eq. 2 as follows:

$$\sum_{i \notin B} \ell(0, f(x_i)) + \min_{j \in B} \ell(1, f(x_j)). \quad \text{(Eq. 2)}$$

For purposes of the disclosed subject matter, including experiments, $\ell$ can be maintained to be the standard cross-entropy loss.

In some embodiments, in addition to, or as an alternative to, this enhanced multiple-instance loss function, the trainer component 202 and AI component 204 also can deploy a curriculum learning type of training procedure to train a row retrieval model (e.g., a neural network model for row retrieval) of the RRC 128 (and associated AI component 204). In certain embodiments, to facilitate determining and generating training data for training of the row retrieval model, weak supervision signals from the final answer text can be utilized, and rows containing the answer directly as a table cell value or indirectly as a span of text in passage connected to the table cell can be labeled as a positive row. In some embodiments, in the initial epochs associated with a training dataset(s) with regard to the trainer component 202 and AI component 204 training the row retrieval model of the RRC 128 based on applying the training dataset(s) to the row retrieval model (e.g., during the initial epochs), the trainer component 202 can use only instances (or at least mostly instances) of the training dataset(s) for whose labels there can be the most confidence, which can include negative rows (e.g., rows that are determined to not contain the correct answer to a query) and queries with only one positive row (e.g., only one row of a group of rows is determined to contain the correct answer to a query). These instances can be considered or defined as denoised instances or denoised single instances. At this point, the row retrieval model can be an intermediate row retrieval model that is partially trained. In the later epochs, the trainer component 202 and AI component 204 can increase the fraction of instances that can have multiple relevant rows (e.g., multiple rows that potentially can contain the correct answer to a query, for example, by having a data item that at least nominally can be a match to the correct answer to the query, without regard to the context of the query) that can be applied to the row retrieval model (e.g., the intermediate row retrieval model) to further train the row retrieval model to desirably (e.g., suitably, more accurately, enhancedly, or optimally) determine rows, from a group of rows of a table(s), that potentially can contain a correct answer to a query or can be associated with a passage data item that potentially can contain the correct answer to the query. These instances that can have multiple relevant rows can be considered or defined as denoised multi-instances, since they are being applied to an intermediate trained row retrieval model (as opposed to an untrained row retrieval model) and the output space associated with the intermediate trained row retrieval model can be highly constrained in that it can be known that the correct row for the query can only be among a few choices, instead of many choices.

With further regard to the AEC 132, given a query and a row, the AEC 132 can aim to extract the correct answer in the form of a table cell or a span in the passages connected to the table cells of that row. Generally, a machine reading comprehension system can require ground truth start and end index as supervision for training, but in HybridQA, neither ground truth start and end index is available (for the case where answer is available in the passage connected to cells in the row) nor is the table cell coordinates (for the case where the answer is a table cell). Furthermore, high level supervision of whether the correct answer is a cell in the table or span in the text (passages connected to cells) also may not be available which can make this a challenging task.

Figure 3:
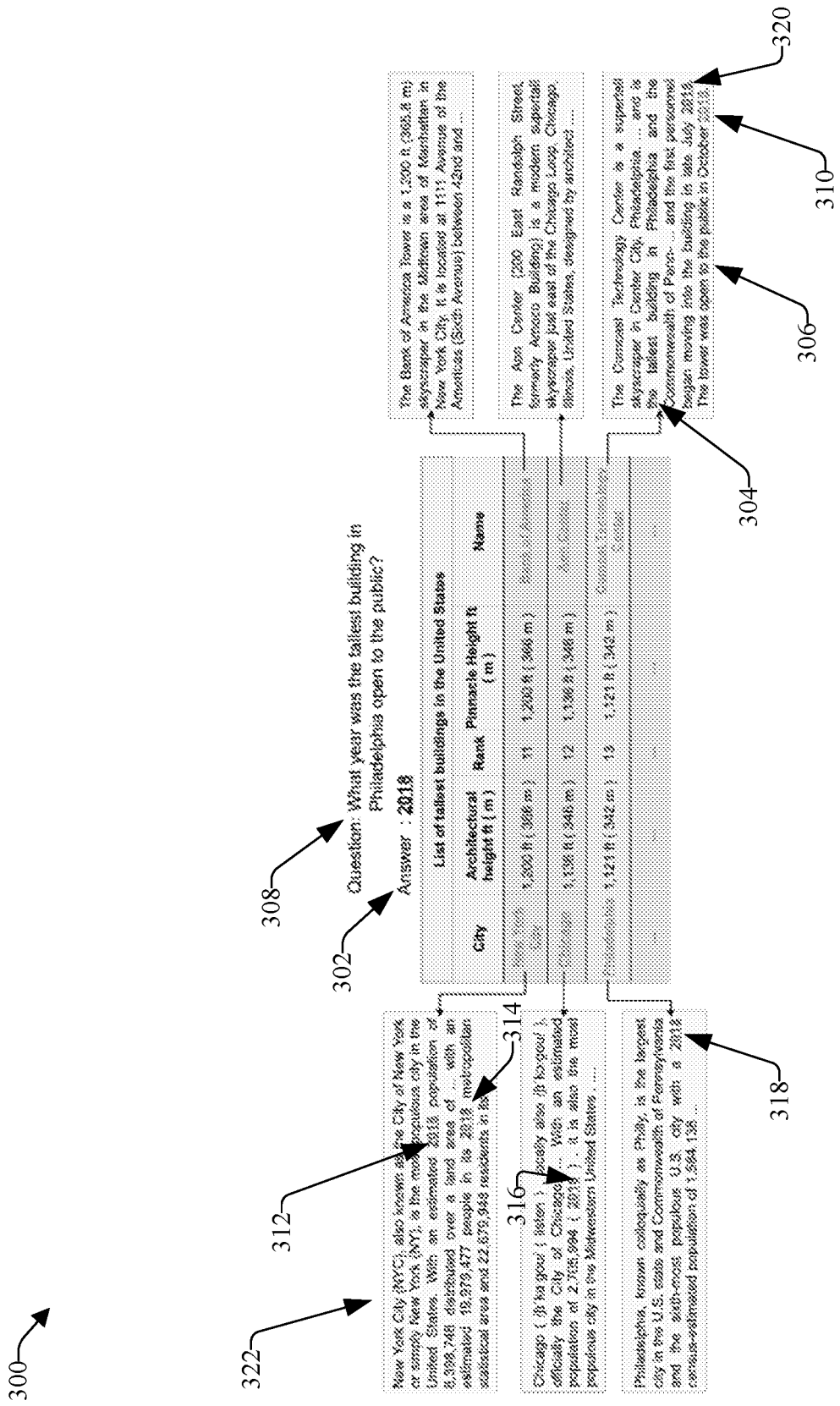
FIG. 3 depicts a diagram of an example question answering problem over hybrid context of table and associated textual passages that can involve an answer value occurring multiple times, both in the correct context and also in irrelevant context.

Extractive reading comprehension models can require exact answer spans along with answer text as training data. This information, however, is absent from most datasets, including HybridQA. Former methods have avoided the issue by assuming the first span as the correct span and passing it to the model. However, this often is not the case. For instance, referring briefly to FIG. 3, FIG. 3 depicts a diagram of an example question answering problem 300 over hybrid context of table and associated textual passages that can involve the answer value (e.g., matching answer value) occurring multiple times, both in the correct context and also in irrelevant context. For example, the correct answer 302 (e.g., 2018) in the correct context (as indicated at reference numerals 304 and 306) responsive to the question 308 is shown at reference numeral 310. However, there also are five other instances (at reference numerals 312, 314, 316, 318, and 320) where the matching answer value (e.g., 2018), although not the correct answer to the question, appears in various passages. Further, as can be observed, the first answer span, associated with passage 322, is not at all related to the question context. Thus, as can be seen, merely assuming the first span as the correct span is essentially as good as selecting a random span within the context, neither of which can be expected to produce accurate results.

With further regard to FIGS. 1 and 2, to overcome these and other challenges associated with existing techniques, the trainer component 202 can employ a MAT paradigm that can suppress incorrect spans matching (e.g., nominally matching) the gold answers, and can determine or identify correct labels for a given answer text. The trainer component 202 can treat contexts with multiple answer-matching spans as noisy. In certain embodiments, to facilitate determining and generating training data for use in answer extractor training, the row and all the passages can be concatenated into a single context for the reading comprehension module associated with (e.g., employed by) the AEC 132. To facilitate the training, enhanced training paradigms can be employed. First, to tackle the multimodality between the row and plain text, row contents can be concatenated as <header> is <cell content>. This can desirably bypass having to have undesirably heavy pretraining on additional special tokens as column and row delimiters. Second, all linked concatenated passages often can exceed the input length limit for most models. This may lead to missed answer if the 'true' passage is truncated away due to the input length limit. Therefore, rather than following the order of hyperlinks or otherwise associated links (e.g., inferred or predicted links), the PRC 124 can desirably rank the passages in order of relevance before concatenation to reduce or minimize the chances of recall loss, such as more fully described herein. For passage ranking, cosine similarities between question embeddings and passage embeddings output can be compared by a msmarco-distilbert-base-tas-b model, for example.

In accordance with various embodiments, the trainer component 202 and/or AI component 204 can employ different strategies for answer extractor training. For instance, in one strategy, the trainer component 202 and/or AI component 204 can train on all rows whose content contain the gold answers. This can be multiple rows for a single question as outlined in the multiple instance issue. Alternatively, the trainer component 202 and/or AI component 204 can employ a different strategy whereby the trainer component 202 and/or AI component 204 can make use of row retriever feedback from the RRC 128 during training.

The trainer component 202 and/or AI component 204 can use training scores of training data to choose only a single row per question. This can constitute training data for training the answer extractor model of the AEC 132.

In some embodiments, the trainer component 202 and AI component 204 can utilize (e.g., apply or execute) Algorithm 1 (e.g., MAT algorithm) to facilitate training a model M (e.g., answer extractor model, which can be or can comprise a neural network), where the initial model M can be an untrained answer extractor (AE). In accordance with Algorithm 1, with regard to data D which can be a training dataset, the trainer component 202 and/or AI component 204 can treat or define all instances (e.g., instances of question and answer of the training dataset) with only a single occurrence of the correct answer (e.g., single-answer answer matching data) as (initially) denoised labels $D_s$ (e.g., single span instances, comprising a number of single-instance data items $d_{si}$). Given that there can be a significant fraction of these denoised single-instance labels $D_s$, the trainer component 202 and/or AI component 204 can train the model M by applying these denoised single-instance labels $D_s$ to the model M, and can generate an intermediate trained model M' based on the applying of these denoised single-instance labels $D_s$ to the model M and AI techniques.

The trainer component 202 and/or AI component 204 can utilize this intermediate trained model M' to score spans (e.g., row data items and/or passage data items) from the noisy instances in $D_m$ (e.g., multi span instances (e.g., multi-answer answer matching data), comprising a number of multi-instance data items $d_{mi}$) in the data D, wherein the noisy instances in $D_m$ can involve multiple instances of the answer (e.g., the correct answer in the correct context, and other nominal answers that match (e.g., are the same data value(s) as) the correct answer, but are associated with an incorrect or irrelevant context). That is, the trainer component 202 and/or AI component 204 can apply the denoised multi-instances $D_m$ (e.g., denoised multi-answer answer matching data associated with contexts) to the intermediate trained model M' of the AEC 132 to further train the intermediate model, and can generate a trained answer extractor model of the AEC 132 based on the applying of these denoised multi-instance labels $D_m$ to the intermediate trained model M' and AI techniques. This can be different from pure inference because, by applying the denoised multi-instances $D_m$ to the intermediate trained model M' (as opposed to an untrained answer extractor model), the output space associated with the intermediate trained model M' can be a highly constrained output space in that it can be known (e.g., by the intermediate trained model M') that the answer can only be among a few (e.g., a relatively small number of) choices, rather of many choices. The best (e.g., highest) scoring span (e.g., answer span) out of all of the spans, as determined by the trained model of the AEC 132, usually can provide denoised label $d_{si}$, which can be the span that can have a minimum (e.g., lowest) loss with regard to the answer extractor model. This combined with the earlier pure (e.g., denoised single-instance) labels can provide a significantly better (e.g., enhanced) training set on which the trainer component 202 and/or AI component 204 can train (e.g., further train) the next version of the trained answer extractor model.

---

Algorithm 1: Multi Answer Training (MAT)

Input: Data D, Untrained AEs M, M'
1. $D_s \leftarrow$ Single span instances in D
2. $D_m \leftarrow$ Multi span instances in D
3. Train model M on $D_s$

---

Algorithm 1: Multi Answer Training (MAT)

4. $\widehat{D_m} \leftarrow \emptyset$
5. for $d_{mi}$ in $D_m$:
6. $\quad d_{si} \leftarrow \text{argmin Loss}_M (s)$ ▷ span having min loss wrt M
$\quad\quad \forall_s \in d_{mi}$
7. $\quad \widehat{D_m} \leftarrow \widehat{D_m} \cup d_{si}$
8. end for $\quad\quad\quad$ ▷ $\widehat{D_m}$ now has the denoised labels
9. Train model M' on $D_s \cup \widehat{D_m}$

---

With further regard to the RC 134, in accordance with various embodiments, the RC 134 can employ multi-instance reranking (MIR) that can determine whether to rerank the candidate answer items produced as an output by the AEC 132 based on a learned weighted combination of the answer scores associated with the candidate answer items and the row retriever scores associated with the rows (e.g., desired number or top-k rows) output by the RRC 128. There can be some occasional instances where the RRC 128 may return an incorrect row (e.g., a row that does not contain, or is not associated with a passage that contains, the correct answer to a query) as a top scored row in response to a query. To recover in such situations, the RC 134 can receive the desired number of rows and associated row retriever scores (e.g., probability, likelihood, confidence, or relevance scores) from the RRC 128 (or can receive the rows from the AEC 132). Widening the beam to utilize the desired number of rows (e.g., top 5 scoring rows), as opposed to only the top scoring row, can be due to the fact that row selector/retrieval recall by the RRC 128 can increase significantly when going from the top-1 to the top-5 (although it is to be appreciated and understood that, in other embodiments, more or less than 5 top scoring rows can be retrieved, selected, and/or output by the RRC 128). The desired number of rows can be passed through and analyzed by the AEC 132, which can determine and output its own set of answer scores that can correspond to start logit and the end logits. In some embodiments, the RC 134 can simulate a joint selection across the RRC 128 and AEC 132 to determine and select the best overall answer in response to the query. The RC 134 can achieve this joint selection and determining of the best overall answer through weighted scoring of these answer and row retrieval scores, and selecting the best set of weights to apply to such scores, according to the best performance on the development set (dev set). In certain embodiments, the RC 134 also can normalize the answer scores and the row retrieval scores in relation to each other, based on desired respective normalization factors, to facilitate a more accurate determination regarding whether to rerank candidate answer items and determination of the correct answer responsive to the query. In some embodiments, the RC 134 can determine the respective weights to apply to the respective answer scores and the row retrieval scores based in part on the respective normalization factors associated with the respective answer scores and the row retrieval scores (e.g., the RC 134 can incorporate the respective normalization factors into the determination of the respective weight values to apply the respective answer scores and the row retrieval scores). The RC 134 can enhance or optimize these weights for using grid search or even trained (e.g., by the trainer component 202 and/or AI component 204) for using model outputs as features and evaluation scores as labels. For instance, the RC 134 can perform a grid search over an estimated search space and can enhance or optimize the weights (e.g., weight values) over the dev set scores. In some embodiments, the RC 134 can perform the multi-instance reranking (MIR) process, as specified by Algorithm 2.

---

Algorithm 2: Multi Instance Reranking

Input: Dev fold D, trained row retriever R, trained answer extractor A, selectivity k, search space of combining weights $\mathcal{W}$
1. for $W \in \mathcal{W}$:
2.     $\hat{D} \leftarrow \emptyset$
3.     for $d_i$ in D:
4.        $D_i = \{d_{i1}, ..., d_{ik}\} \leftarrow$ Top-k rows given by $R(d_i)$
5.        for $d_{ij}$ in $D_i$:
6.           $s_{RR} \leftarrow$ row retrieval score from $R(d_{ij})$
7.           $(st_{AE}, en_{AE}) \leftarrow$ start and end logits from $A(d_{ij})$
8.           $S_{ij} \leftarrow [s_{RR}\ st_{AE}\ en_{AE}]^T$
9.           $rs_{ij} \leftarrow W^T S_{ij}$
10.        end for
11.        $l \leftarrow \text{argmax}_j\ rs_{ij}$
12.        $\hat{D} \leftarrow \hat{D} \cup \{d_{il}\}$
13.     end for
14.     $score_W \leftarrow$ evaluate model A on $\hat{D}$
15. end for
16. Select/train W to maximise $score_W$

---

Experiments have demonstrated that the reranking process that can be employed by the RC 134 can result in significant improvements in determining correct answers to queries over both the test and development sets.

With further regard to the AI component 204, in accordance with various embodiments, in connection with or as part of such an analysis by the AI component 204, the AI component 204 can employ, build (e.g., construct or create), and/or import, AI and/or ML techniques and algorithms, AI and/or ML models (e.g., row retrieval models, answer extractor models, or reranker models), neural networks (e.g., deep neural networks trained using the AI component 204), and/or graph mining to render and/or generate predictions, inferences, calculations, prognostications, estimates, derivations, forecasts, detections, and/or computations that can facilitate making one or more determinations relating to determining correct answers to queries from information in and/or across tables and text (e.g., passages). For instance, the trainer component 202 can input training data (e.g., row retrieval training data, answer extractor training data, or reranker training data), and/or other desired information, into an AI-based model (e.g., AI model, ML model, or deep neural network).

The AI component 204 can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 204 can examine the entirety or a subset of the data (e.g., data associated operation of the MITQA system, data associated with a query or queries, data associated with tables or passages, data associated with a training dataset, metadata, historical information relating thereto, or other desired types of information) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, or receiving extrinsic information) schemes and/or systems (e.g., support vector machines, neural networks, expert systems, Bayesian belief networks, fuzzy logic, or data fusion engines) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=\text{confidence(class)}$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

In certain embodiments, the trainer component 202 and/or AI component 204 can train AI-based models (e.g., row retrieval models, answer extractor models, or reranker models) on an iterative or continuing basis based on applying (e.g., inputting) additional training data to the models, as such additional training data is produced or received. As more training iterations are performed on an AI-based model, over time, such AI-based model can become increasingly improved, and, accordingly, the inferences, predictions, estimates, or determinations relating to row retrieval, answer extraction, answer determinations, or reranking of candidate answer items produced by the AI-based model can become increasingly improved.

In accordance with various embodiments, the processor component 206 can work in conjunction with the other components (e.g., components of the system 100, trainer component 202, AI component 204, data store 208, or other component) to facilitate performing the various functions of the system 200. The processor component 206 can employ one or more processors, microprocessors, or controllers that can process data, such as information relating to queries, tables, rows, row cells, table header items, passage data items, algorithms (e.g., Algorithm 1, Algorithm 2, or other algorithms as indicated or defined by the processes, protocols, methods, and/or techniques described herein), answer scores, row retrieval scores, relevance scores, weight values, models, candidate answer item filter criteria, row filter criteria, score weighting criteria, users, communication devices, traffic flows, policies, protocols, interfaces, tools, and/or other information, to facilitate operation of the system 200, as more fully disclosed herein, and control data flow between the system 200 and other components (e.g., communication devices, applications, data storage devices, user devices or end-point devices, interfaces, or other computing devices) associated with (e.g., connected to) the system 200.

The data store 208 can store data structures (e.g., user data, metadata), code structure(s) (e.g., modules, objects, hashes, classes, procedures) or instructions, information relating to queries, tables, rows, row cells, table header items, passage data items, algorithms (e.g., Algorithm 1, Algorithm 2, or other algorithms as indicated or defined by the processes, protocols, methods, and/or techniques described herein), answer scores, row retrieval scores, relevance scores, weight values, models, candidate answer item filter criteria, row filter criteria, score weighting criteria, users, communication devices, traffic flows, policies, protocols, interfaces, tools, and/or other information, to facilitate controlling operations associated with the system 200. In an aspect, the processor component 206 can be functionally coupled (e.g., through a memory bus) to the data store 208 in order to store and retrieve information desired to operate and/or confer functionality, at least in part, to the components of the system 100, trainer component 202, AI component 204, processor component 206, data store 208, or other component, and/or substantially any other operational aspects of the system 200.

Figure 4:
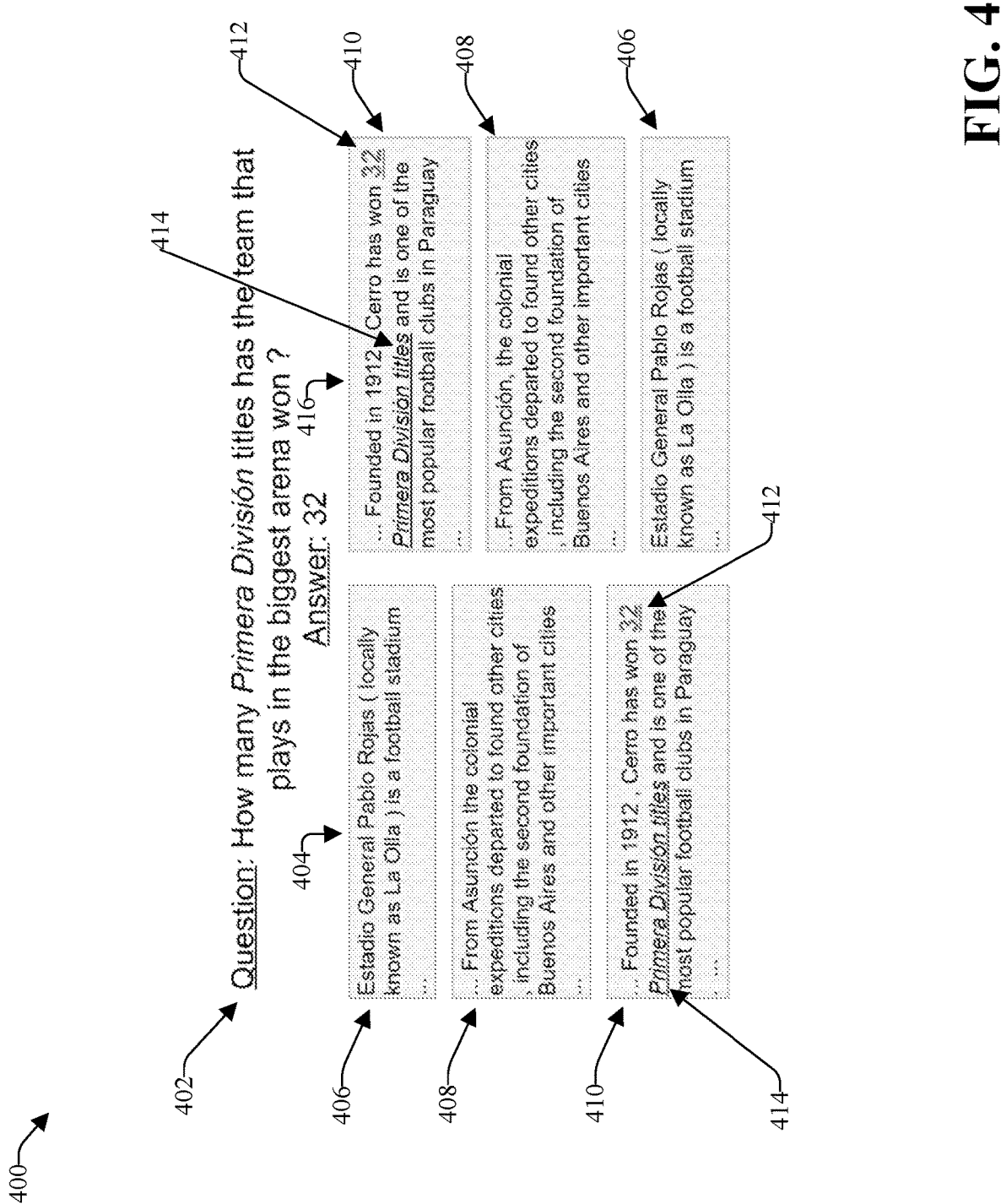
FIG. 4 presents a diagram of an example passage reranking, in accordance with various aspects and embodiments of the disclosed subject matter.

Referring to FIGS. 4-7 (along with FIGS. 1 and 2), FIGS. 4-7 present examples of enhanced results relating to question answering over table and/or textual information that can be achieved using the systems and techniques disclosed herein. FIG. 4 presents a diagram of an example passage reranking 400, in accordance with various aspects and embodiments of the disclosed subject matter. With regard to the question 402, the original (e.g., unranked) arrangement 404 of the passages 406, 408, and 410 are shown. The original arrangement 404 can be without regard to the context of the question 402. It can be observed that the correct answer 412 (e.g., 32) is in passage 410 at the bottom of the original arrangement 404. The PRC 124 can determine the context of the question 402 based on analysis of the question 402, wherein relevant text to the context in the passages (e.g., passage 410) can be indicated by reference numeral 414. The PRC 124 can determine passage relevance scores based on analysis of the context and the information in the passages 406, 408, and 410. The PRC 124 can rank the passages 406, 408, and 410 based on their respective relevance scores to produce the relevance ranked arrangement 416 of the passages 406, 408, and 410, such that passage 410, with the highest passage relevance score, can be ranked at the top, since the PRC 124 determined passage 410 to be more relevant to the question 402 than the other passages 406 and 408. The re-ranking of passages based on relevance to the question can increase the likelihood that the more relevant passages will be input to the row retrieval model and/or answer extractor model, and decrease the likelihood that those more relevant passages will be truncated and filtered out due to input sequence size factors (e.g., input sequence size limitations) associated with the row retrieval model and/or answer extractor model.

Figure 5:
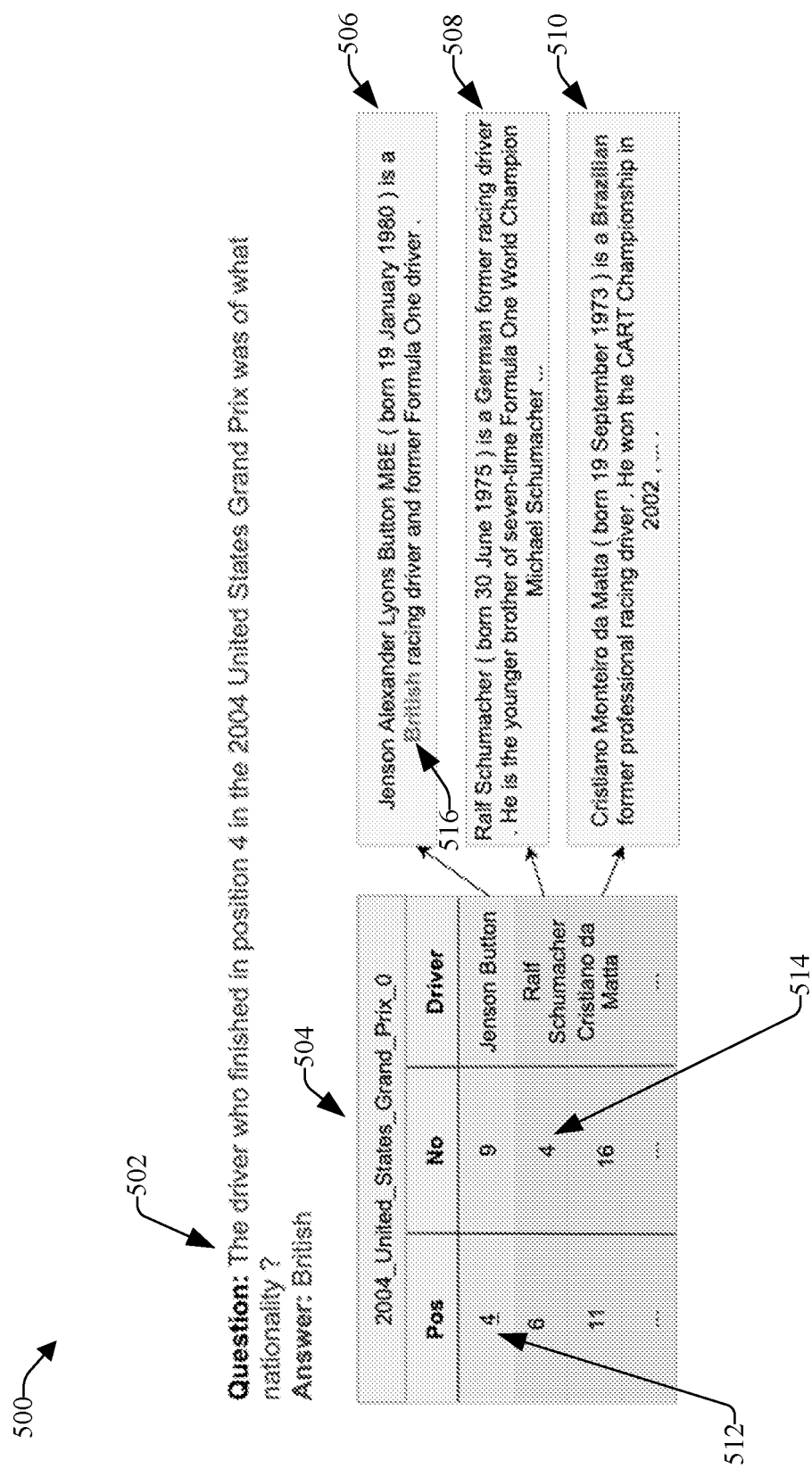
FIG. 5 presents a diagram of an example question answering, in accordance with various aspects and embodiments of the disclosed subject matter.

FIG. 5 presents a diagram of an example question answering 500, in accordance with various aspects and embodiments of the disclosed subject matter. With regard to the question 502, the system 100 can analyze the table content of the table 504 and passage content of the passages 506, 508, and 510 associated with respective rows of the table 504. The context of the question 502 relates to position 4, and the table 504 includes cell 512 and cell 514 that both include the value 4, where cell 512 is under the position (pos) header and cell 514 is under the number (No) header. The system 100, employing the techniques described herein, can determine the context of the question 502 based on analysis of the question 502, and can disambiguate the multiple instances of the value 4 appearing both cell 512 and cell 514 to determine that the value 4 appearing in cell 512 is relevant to the context of the question 502, and the value 4 appearing in cell 514 is not relevant to the context of the question 502. Based on such analysis and determinations, the system 100 (e.g., employing the RRC 128, AEC 132, and/or RC 134) can determine that the correct answer 516 (e.g., British) is contained in passage 506, rather than German or Brazilian, and can return the correct answer 516 in response to the question 502.

Figure 6:
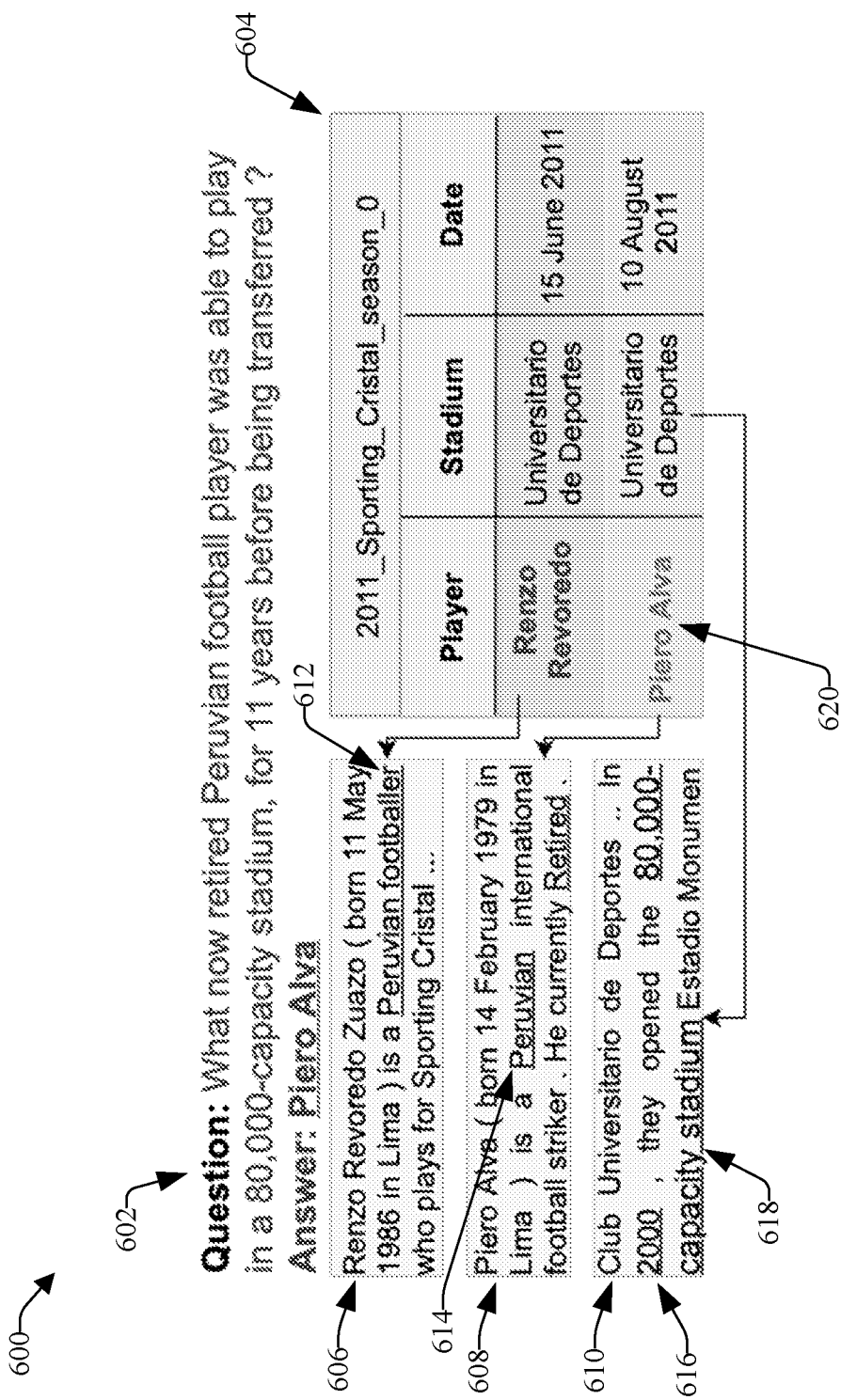
FIG. 6 depicts a diagram of another example question answering, in accordance with various aspects and embodiments of the disclosed subject matter.

FIG. 6 depicts a diagram of another example question answering 600, in accordance with various aspects and embodiments of the disclosed subject matter. This example can illustrate the benefits of multi-instance reranking of the disclosed subject matter. With regard to the question 602, the system 100 can analyze the table content of the table 604 and passage content of the passages 606, 608, and 610 associated with respective rows of the table 604. The system 100 can identify portions of the content relating to the context, as indicated at reference numerals 612, 614, 616, and 618. While both Zuazo and Alva have similar information respectively associated therewith, the system 100 (e.g., employing multi-instance reranking) can identify that only Alva is retired, which is part of the context of the question 602. Accordingly, the system 100 can determine that Piero Alva is the correct answer 620, even though Renzo Zuazo may have mistakenly selected as the answer using existing techniques instead of the disclosed multi-instance reranking techniques.

Figure 7:
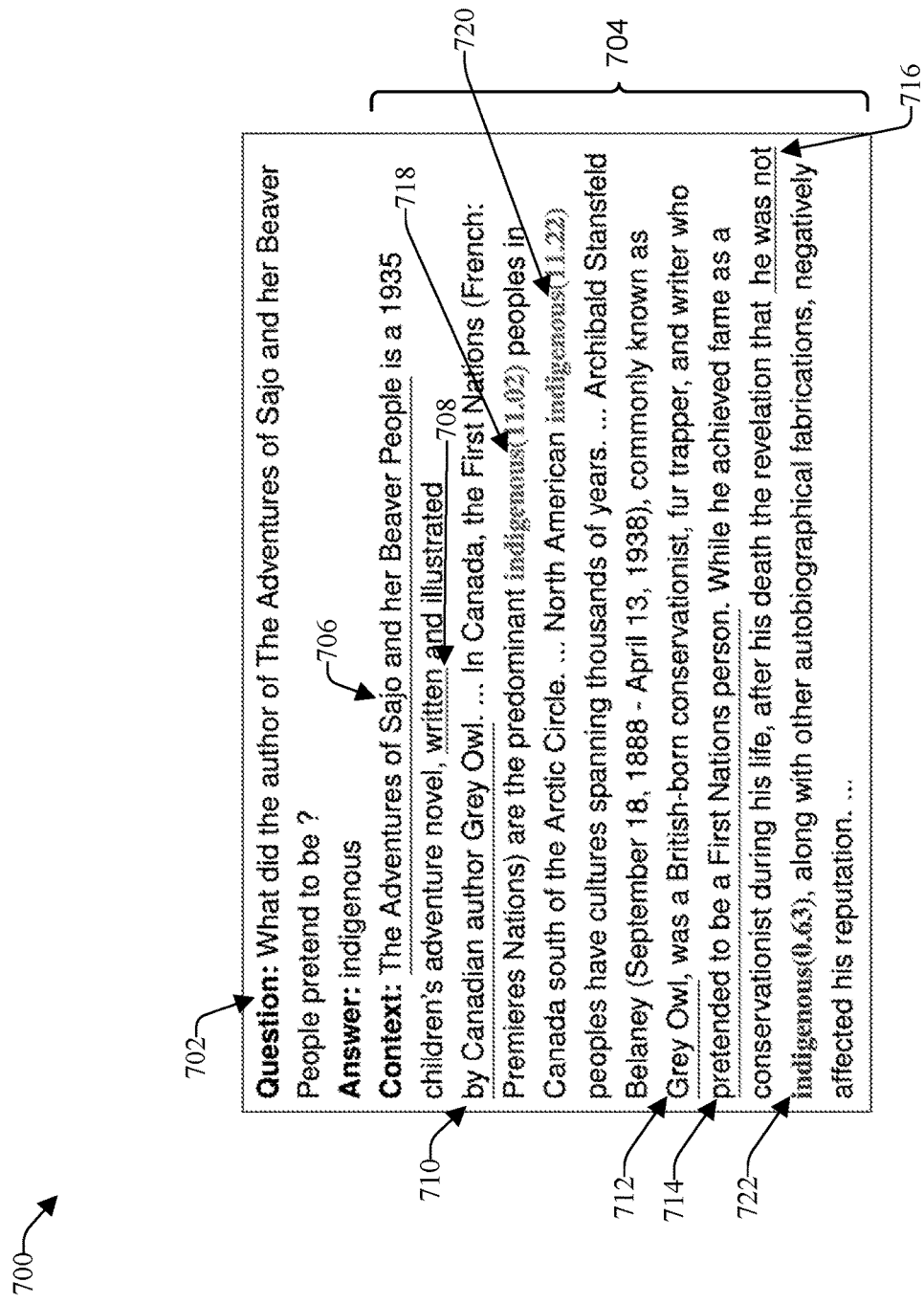
FIG. 7 presents a diagram of still another example question answering, in accordance with various aspects and embodiments of the disclosed subject matter.

FIG. 7 presents a diagram of still another example question answering 700, in accordance with various aspects and embodiments of the disclosed subject matter. This example can illustrate the benefits of MAT and enhanced answer extraction of the disclosed subject matter. With regard to the question 702, the system 100 can analyze the content 704 (e.g., which can be from a table and/or associated passage content) and can determine the context of the question 702 based on analysis of the question 702. Also, based on the analysis, the system 100 can identify portions of the content 704 relating to the context, as indicated at reference numerals 706, 708, 710, 712, 714, and 716. While the word indigenous appears in three instances 718, 720, and 722 in the content 704, the system 100 (e.g., employing the RRC 128, AEC 132, and/or the RC 134, and the disclosed techniques) can determine respective loss function values associated with the respective instances 718, 720, and 722 of the word indigenous in the content 704. The system 100 can determine that the instance 722 (which is the correct answer) has the lowest loss function value (0.63), while the other irrelevant instances 718 and 720 of the word indigenous have higher loss function values (11.02 and 11.22, respectively).

The techniques for enhanced text and table question answering based on multi-instance, multi-answer training of the disclosed subject matter, such as described herein, can have a number of desirable advantages over existing question answering techniques. For example, such techniques can enhance (e.g., improve, increase, or optimize accuracy of) determinations of a correct answer in response to a query, where the correct answer may be in a row cell of a table or a passage data item associated with (e.g., linked to or otherwise associated with) the table, and where there may be multiple instances of a data value matching the data value of the correct answer in various contexts, including the correct context associated with the query and incorrect or irrelevant contexts not associated with the query. The disclosed techniques also can enhance the training of row retrievers and answer extractors.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
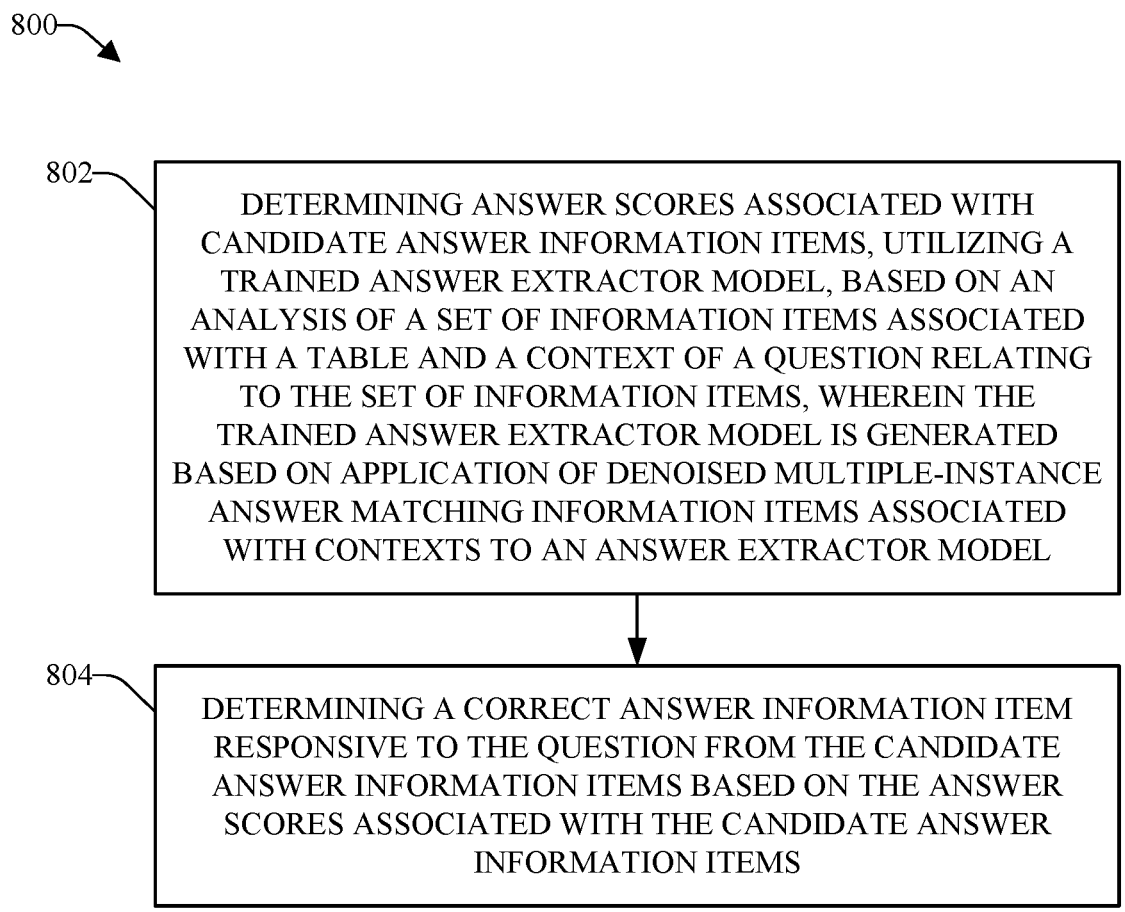
FIG. 8 illustrates a flow diagram of an example, non-limiting method that can perform enhanced text and table question answering based on multi-instance, multi-answer training, in accordance with various aspects and embodiments of the disclosed subject matter.

FIG. 8 illustrates a flow diagram of an example, non-limiting method 800 that can perform enhanced text and table question answering based on multi-instance, multi-answer training, in accordance with various aspects and embodiments of the disclosed subject matter. In some embodiments, the method 800 can be performed by, for example, one or more of the systems (e.g., MITQA system and/or training system) described herein and/or a processor component, which can be associated with a data store. Repetitive description of like elements employed in other embodiments described herein is or may be omitted for sake of brevity.

At 802, answer scores associated with candidate answer information items can be determined, utilizing a trained answer extractor model, based on an analysis of a set of information items associated with a table and a context of a question relating to the set of information items, wherein the trained answer extractor model is generated based on application of denoised multiple-instance answer matching information items associated with contexts to an answer extractor model. The answer extractor model can be generated and trained, using multi-answer training, based on the application of denoised single-instance answer matching information items and the denoised multiple-instance answer matching information items associated with the contexts to the answer extractor model, such as described herein. The AEC, employing the trained answer extractor model, can determine the answer scores associated with the candidate answer information items based on the analysis of the set of information items associated with the table and the context of the question, such as described herein. In accordance with various embodiments, the information of or associated with the table (e.g., respective content in respective row information items in respective cells of respective rows of the table and/or respective passage information items associated with the respective rows) can be analyzed and/or processed (e.g., pre-processed) by the TPC, PRC, RRC, and/or other components of the system (e.g., MITQA system) before the analysis the set of information items associated with the table and the context of the question and the determining of the answer scores associated with the candidate answer information items by the AEC, such as described herein.

At 804, a correct answer information item responsive to the question can be determined from the candidate answer information items based on the answer scores associated with the candidate answer information items. The QRC can determine and/or provide the correct answer information item responsive to the question from the respective candidate answer information items based on the respective answer scores associated with the respective candidate answer information items, such as described herein. In some embodiments, the correct information item can be determined based on a determination of the candidate answer information item of the candidate answer information items that has the highest answer score, as determined by the AEC. In other embodiments, the RC can determine the correct information item based on respective weighted answer scores associated with the respective candidate answer information items and/or respective weighted row scores associated with the respective rows associated with the respective candidate answer information items, such as described herein.

Figure 9:
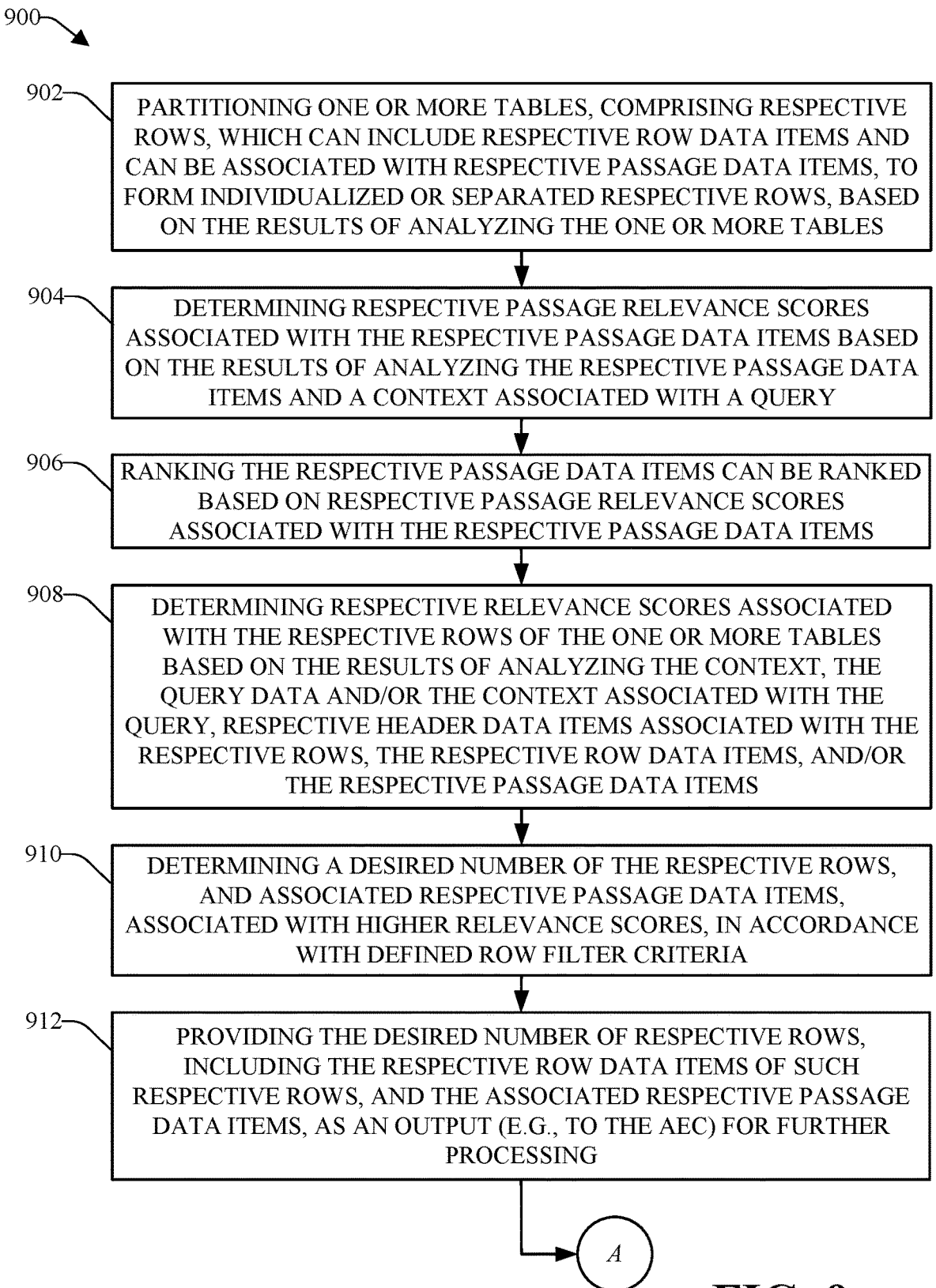

FIGS. 9 and 10 depict a flow diagram of another example, non-limiting method 900 that can perform enhanced text and table question answering based on multi-instance, multi-answer training, in accordance with various aspects and embodiments of the disclosed subject matter. The method 900 can be performed by, for example, one or more of the systems (e.g., MITQA system and/or training system) described herein and/or a processor component, which can be associated with a data store. Repetitive description of like elements employed in other embodiments described herein is or may be omitted for sake of brevity.

At 902, one or more tables, comprising respective rows, which can include respective row data items and can be associated with respective passage data items, can be partitioned (e.g., by the TPC) to form individualized or separated respective rows, comprising the respective row data items and associated with the respective passage data items, based on the results of analyzing the one or more tables, such as described herein.

At 904, respective passage relevance scores associated with the respective passage data items can be determined (e.g., by the PRC) based on the results of analyzing the respective passage data items and a context associated with a query. At 906, the respective passage data items can be ranked (e.g., by the PRC) based on respective passage relevance scores associated with the respective passage data items. For instance, the PRC can rank, order, and/or filter (e.g., filter out some passage data items that have lower passage relevance scores) based on the respective passage relevance scores associated with the respective passage data items, such that passage data items having higher passage relevance scores can be ranked higher than other passage data items having relatively lower passage relevance scores.

At 908, respective relevance scores associated with the respective rows of the one or more tables can be determined (e.g., by the (trained) RRC) based on the results of analyzing the context, the query data and/or the context associated with the query, respective header data items associated with the respective rows, the respective row data items, and/or the respective passage data items (e.g., at least higher ranked passage data items). At 910, a desired number of the respective rows, and associated respective passage data items, associated with higher relevance scores can be determined (e.g., by the (trained) RRC), in accordance with defined row filter criteria. For instance, based on the respective relevance scores and the defined row filter criteria, the RRC can determine the desired number (e.g., five, or a different number greater than or less than five) of the respective rows that have relatively higher relevance scores than other relevance scores of other rows of the respective rows. At 912, the desired number of respective rows, including the respective row data items of such respective rows, and the associated respective passage data items, can be provided (e.g., by the RRC) as an output (e.g., to the AEC) for further processing. In some embodiments, the RRC can provide the respective relevance scores associated with the desired number of respective rows to the RC for further processing. At this point, the method 900 can proceed to reference point A, wherein the method 900 can continue from reference point A, as shown in FIG. 10 and described herein.

At 914, respective answer scores associated with respective candidate answer items can be determined (e.g., by the (trained) AEC) based on analysis of the query data and/or the context associated with the query, the respective row data items of the respective rows of the desired number of respective rows, and the associated respective passage data items. For instance, based on the analysis results, the AEC can determine respective candidate answer items from the respective row data items and/or the respective passage data items, and can determine the respective answer scores associated with the respective candidate answer items. The answer scores can indicate the respective and relative likelihoods that the candidate answer items are the correct answer to the query.

At 916, based on the respective answer scores and a defined candidate answer item filter criteria related to answer extraction, a desired number of the respective candidate answer items and the respective answer scores associated therewith can be provided as an output for further processing. The AEC can determine the desired number (e.g., top-k number, such as five, or a different number greater than or less than five) of the respective candidate answer items that have higher answer scores than other the other respective candidate answer items based on analysis of the respective answer scores and the defined candidate answer item filter criteria relating to answer extraction. The AEC can provide the desired number of the respective candidate answer items and the respective answer scores associated therewith as an output (e.g., to the RC) for further processing.

At 918, respective weight values can be applied (e.g., by the RC) to the respective answer scores associated with the desired number of the respective candidate answer items and the respective relevance scores associated with the desired number of the respective rows to generate weighted scores associated with the respective candidate answer items and the respective rows based on defined score weighting criteria. In accordance with various embodiments, the RC can determine the respective weight values based on training of a reranker model of the RC or performing a grid search over an estimated search space and enhancing (e.g., optimizing) over the development set scores, such as described herein.

At 920, the correct answer data item responsive to the query can be determined (e.g., by the RC) based on the respective weights scores. For instance, from the candidate answer data items, the RC can determine the candidate answer data item that can be associated with the highest weighted score relative to other lower weighted scores associated with the other candidate answer items. Based on such candidate answer data item having the highest weighted score, the RC can determine that the candidate answer data item is the correct answer data item that is responsive to the query.

At 922, the correct answer data item can be presented in response to the query. The QRC can present (e.g., communicate, display, or emit) the correct answer data item and/or other information (e.g. other candidate answer data items, their respective weighted scores, and/or other desired information), via an interface or communication device (e.g., to a user), in response to the query.

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 11:
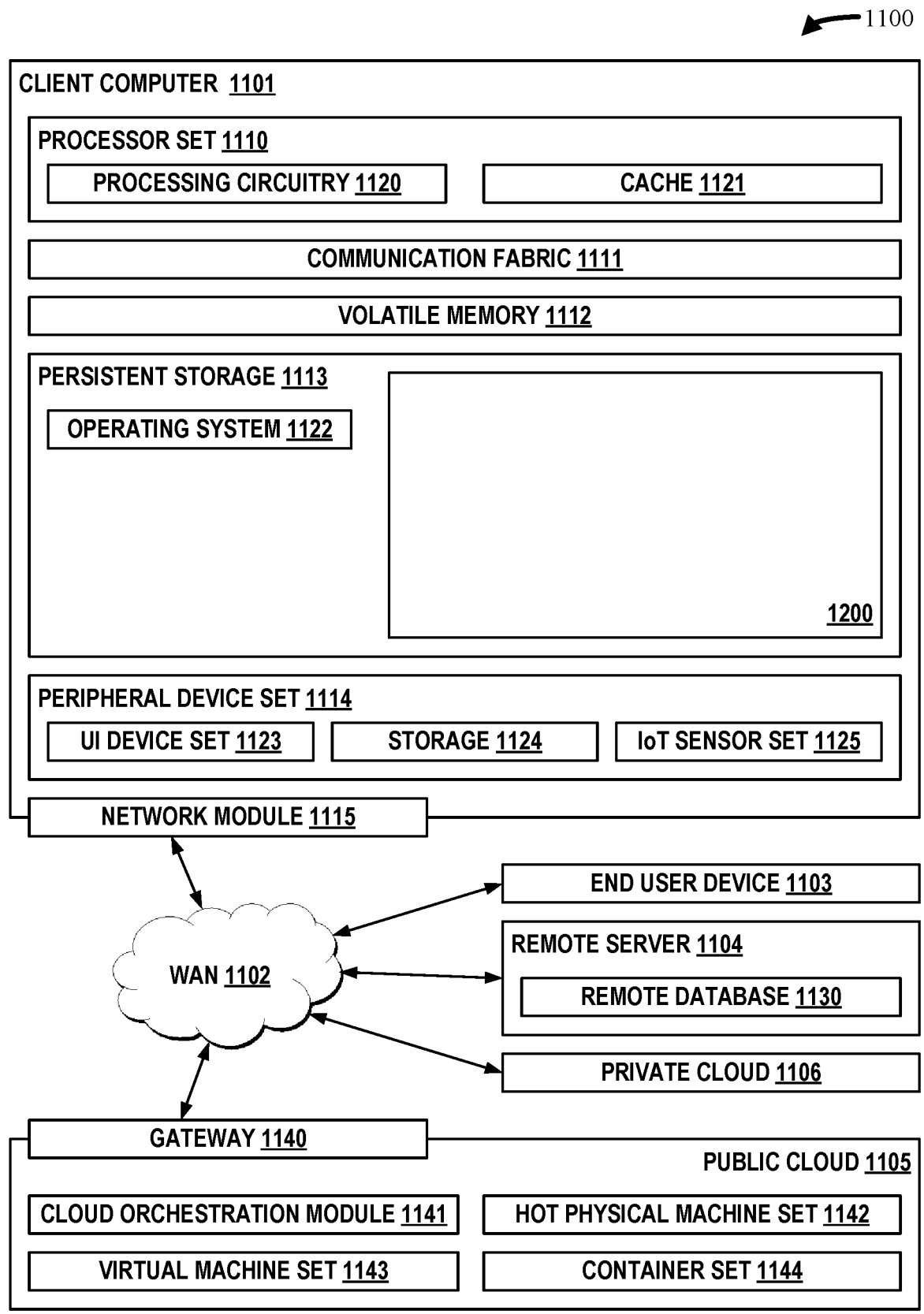
FIG. 11 illustrates a block diagram of an example, non-limiting computing environment in which one or more embodiments described herein can be facilitated.

Turning next to FIG. 11, a detailed description is provided of additional context for the one or more embodiments described herein at FIGS. 1-10. FIG. 11 and the following discussion are intended to provide a general description of a suitable computing environment 1100 (e.g., computing operating environment) in which one or more embodiments described herein at FIGS. 1-10 can be implemented. For example, one or more components and/or other aspects of embodiments described herein can be implemented in or be associated with, such as accessible via, the computing environment 1100. Further, while one or more embodiments have been described above in the general context of computer-executable instructions that can run on one or more computers, those skilled in the art will recognize that one or more embodiments also can be implemented in combination with other program modules and/or as a combination of hardware and software.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1100 contains an example of an environment for the execution of at least some of the computer code involved in performing the inventive methods, such as enhanced question answering management and operation code 1200 (also referred to herein as block 1200). In addition to block 1200, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD)

card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

One or more embodiments can be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can include the following: a portable computer diskette, a hard disk, a RAM, a ROM, an EPROM or Flash memory, an SRAM, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art. Also, the enumeration or designation of an item or element does not necessarily mean that the item or element specifically has to have that particular number as an attribute, a descriptor, or a quantifier. For instance, as used in the subject specification, claims, and annexed drawings, unless specified otherwise, or clear from the context, an enumeration or designation, such as "first" with regard to an item or element may refer to any one of the items or elements of a group of items or elements and does not necessarily mean that the item or element has to be the first item or element of the group, and "second" with regard to an item or element may refer to any other one of the items or elements of the group of items or elements and does not necessarily mean that such item or element has to be the second item or element of the group.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include ROM, PROM, EPROM, electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as SRAM, DRAM, synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer-executable components; and
a processor, operatively coupled to the memory, that executes computer-executable components, the computer-executable components comprising:
an answer extractor component that determines answer scores associated with candidate answer data items based on an analysis of a set of data associated with a table and a context of a query of the set of data, wherein the answer extractor component is trained based on application of denoised multiple-instance answer matching data associated with contexts to an answer extractor model to generate a trained answer extractor model of the answer extractor component; and
a query response component that determines a correct answer data item responsive to the query from the candidate answer data items based on the answer scores associated with the candidate answer data items.

2. The system of claim 1, wherein the set of data comprises row data items in cells of rows of the table and passage data items associated with the rows, and wherein answer matching data items of the denoised multiple-instance answer matching data are associated with other rows of other tables or other passage data items associated with the other rows.

3. The system of claim 2, wherein the row data items comprise a row data item, wherein the passage data items comprise a passage data item, and wherein the row data item comprises or is associated with a link that is usable to access the passage data item associated with the link.

4. The system of claim 2, wherein the rows are first rows of the table, wherein the cells are first cells, wherein the table comprises the first rows and second rows, wherein the row data items are first row data items in the first cells of the first rows, wherein the passage data items are first passage data items, wherein second row data items are in second cells of the second rows, and wherein second passage data items are associated with the second rows.

5. The system of claim 4, wherein the computer-executable components further comprise:
a passage filter component that analyzes query data of the query, the first passage data items, and the second passage data items,
wherein the passage filter component determines passage relevance values associated with the first passage data items and the second passage data items, based on the analysis, wherein the context of the query is determined based on the analysis, and
wherein the passage filter component ranks the first passage data items and the second passage data items, based on the passage relevance values.

6. The system of claim 4, wherein the computer-executable components further comprise:
a row retriever component that determines row retrieval scores associated with the first rows and the second rows based on analysis of the context, query data of the query, header data items associated with the rows, the first row data items, the first passage data items, the second row data items, or the second passage data items, and
wherein, based on the row retrieval scores and a defined row filter criterion, the row retriever component determines that the first rows satisfy the defined row filter criterion and the second rows do not satisfy the defined row filter criterion, and provides the first rows as an output.

7. The system of claim 6, wherein the row retriever component comprises a prediction model that is trained to predict one or more candidate rows that contain or are associated with the correct answer data item based on single-instance training data or multi-instance training data, wherein the single-instance training data relates to a first training question associated with a single row determined to potentially contain or be associated with first correct answer data responsive to the first training question, wherein the single row is associated with a first table, wherein the multi-instance training data relates to a second training question associated with multiple rows determined to potentially contain or be associated with second correct answer data responsive to the second training question, and wherein the multiple rows are associated with a second table.

8. The system of claim 6, wherein the computer-executable components further comprise:
a ranking adjuster component that analyzes the first row data items of the first rows, the first passage data items, the row retrieval scores associated with the first rows, the candidate answer data items, or the answer scores associated with the candidate answer data items,
wherein the ranking adjuster component applies weight values to the answer scores and the row retrieval scores, and generates weighted scores based on the application of the weight values to the answer scores and the row retrieval scores, and
wherein the ranking adjuster component determines the correct answer data item responsive to the query from the candidate answer data items based on the weighted scores.

9. The system of claim 1, wherein the answer extractor model is trained, based on application of denoised single-instance answer match data associated with the contexts to the answer extractor model, to generate an intermediate trained extractor model, and wherein the intermediate answer extractor model is trained, based on application of the denoised single-instance answer match data and the denoised multiple-instance answer matching data associated with the contexts to the intermediate answer extractor model, to generate the trained answer extractor model.

10. The system of claim 9, wherein the answer extractor model is based on a neural network, wherein the trained answer extractor model is based on a trained neural network that is trained based on the application of the denoised single-instance answer match data and the denoised multiple-instance answer matching data associated with the contexts to the neural network.

11. A computer-implemented method, comprising:

determining, by a trained answer extractor model of a system operatively coupled to a processor, answer scores associated with candidate answer information items based on an analysis of a set of information items associated with a table and a context of a question of the set of information items, wherein the trained answer extractor model is generated based on application of denoised multiple-instance answer matching information items associated with contexts to an answer extractor model; and determining, by the system, a correct answer information item responsive to the question from the candidate answer information items based on the answer scores associated with the candidate answer information items.

12. The computer-implemented method of claim 11, wherein the set of information items comprises row information items in cells of rows of the table and passage information items associated with the rows, and wherein answer matching information items of the denoised multiple-instance answer matching information items are associated with other rows of other tables or other passage information items associated with the other rows.

13. The computer-implemented method of claim 12, wherein the row information items comprise a row information item, wherein the passage information items comprise a passage information item, and wherein the row information item comprises or is associated with a hyperlink that is usable to access the passage information item associated with the hyperlink.

14. The computer-implemented method of claim 12, wherein the rows are first rows of the table, wherein the cells are first cells, wherein the table comprises the first rows and second rows, wherein the row information items are first row information items in the first cells of the first rows, wherein the passage information items are first passage information items, wherein second row information items are in second cells of the second rows, and wherein second passage information items are associated with the second rows.

15. The computer-implemented method of claim 14, further comprising:

analyzing, by the system, question information of the question, the first passage information items, and the second passage information items;

determining, by the system, passage relevance values associated with the first passage information items and the second passage information items, based on the analyzing, wherein the context of the question is determined based on the analyzing; and ranking, by the system, the first passage information items and the second passage information items based on the passage relevance values.

16. The computer-implemented method of claim 14, further comprising:

determining, by the system, relevance scores associated with the first rows and the second rows based on analyzing the context, question information of the question, header information items associated with the rows, the first row information items, the first passage information items, the second row information items, or the second passage information items;

based on the relevance scores and a defined row filter criterion, determining, by the system, that the first rows satisfy the defined row filter criterion and the second rows do not satisfy the defined row filter criterion; and presenting, by the system, the first rows as an output.

17. The computer-implemented method of claim 16, further comprising:

analyzing, by the system, the first row information items of the first rows, the first passage information items, the relevance scores associated with the first rows, the candidate answer information items, or the answer scores associated with the candidate answer information items;

applying, by the system, weight values to the answer scores and the relevance scores;

generating, by the system, weighted scores based on the applying of the weight values to the answer scores and the relevance scores; and determining, by the system, the correct answer information item responsive to the question from the candidate answer information items based on the weighted scores.

18. The computer-implemented method of claim 11, wherein the answer extractor model is trained, based on application of denoised single-instance answer match information associated with the contexts to the answer extractor model, to generate an intermediate trained extractor model, and wherein the intermediate answer extractor model is trained, based on application of the denoised single-instance answer match information and the denoised multiple-instance answer matching information associated with the contexts to the intermediate answer extractor model, to generate the trained answer extractor model.

19. A computer program product that facilitates determination of a correct answer data item responsive to a query, the computer program product comprising a computer readable storage medium having program instructions embodied therewith, the program instructions are executable by a processor to cause the processor to:

determine, by a trained answer extractor function, answer scores associated with candidate answer data items based on an analysis of a set of data and a context of the query of the set of data, the set of data comprising row data items in cells of rows of a table and passage data items associated with the rows, wherein an answer extractor function is trained based on application of denoised multiple-instance answer matching data associated with contexts to the answer extractor function to generate the trained answer extractor function; and determine the correct answer data item responsive to the query from the candidate answer data items based on the answer scores associated with the candidate answer data items.

20. The computer program product of claim 19, wherein the row data items comprise a row data item, wherein the passage data items comprise a passage data item, and wherein the row data item comprises a hyperlink that is usable to access the passage data item associated with the hyperlink.

\* \* \* \* \*